U S006967679B2

(12) United States Patent
Fujimoto (10) Patent No.: US 6,967,679 B2
(45) Date of Patent: Nov. 22, 2005

(54) IMAGING APPARATUS, IMAGING OPTICAL UNIT, AND IMAGING SYSTEM

(75) Inventor: Makoto Fujimoto, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 664 days.

(21) Appl. No.: 10/085,540

(22) Filed: Feb. 27, 2002

(65) Prior Publication Data

US 2002/0130960 A1 Sep. 19, 2002

(30) Foreign Application Priority Data

Feb. 28, 2001 (JP) .............................. 2001/55510
Feb. 22, 2002 (JP) .............................. 2001/46420

(51) Int. Cl.[7] ........................ H04N 5/235; H04N 5/202
(52) U.S. Cl. ................. 348/221.1; 348/254; 348/231.9
(58) Field of Search .................... 348/221.1, 223.1, 348/222.1, 254, 255, 256, 674, 364, 365, 348/207.99, 340, 231.3, 231.6, 231.9; 396/268, 396/271, 231.3, 231.6, 231.9

(56) References Cited

U.S. PATENT DOCUMENTS

| 4,586,029 A | * | 4/1986 | Tamura et al. ............... 340/540 |
| 5,414,535 A | * | 5/1995 | Kanmoto et al. ............ 358/487 |
| 5,457,540 A | * | 10/1995 | Kajita ......................... 358/296 |
| 5,485,208 A | * | 1/1996 | Mabuchi et al. ............ 348/335 |
| 5,668,596 A | * | 9/1997 | Vogel ........................ 348/222.1 |
| 5,710,594 A | * | 1/1998 | Kim ............................ 348/254 |
| 6,023,533 A | * | 2/2000 | Sano et al. .................. 382/274 |
| 6,650,365 B1 | * | 11/2003 | Sato .......................... 348/231.3 |
| 2004/0201707 A1 | * | 10/2004 | Noguchi et al. .......... 348/208.7 |

FOREIGN PATENT DOCUMENTS

| JP | 01037168 A | * | 2/1989 | ............ H04N 1/40 |
| JP | 6-165023 | | 6/1994 | |
| JP | 06165023 A | * | 6/1994 | .......... H04N 5/235 |

* cited by examiner

Primary Examiner—David L. Ometz
Assistant Examiner—Lin Ye
(74) Attorney, Agent, or Firm—Morgan & Finnegan, LLP (57) ABSTRACT

The present invention discloses an imaging apparatus constructed as follows. The imaging apparatus picks-up a subject image formed by a imaging optical unit, and comprises an image pickup device for photoelectrically converting a subject image, a memory for storing gamma property data of the image pickup device and light quantity distribution data of incident light in accordance with pixel positions on the image pickup device; and a correcting circuit for correcting image signals outputted from each pixel of the image pickup device based on the gamma property data and light quantity distribution data that are stored in the memory. Thereby, a drop in peripheral light quantity can be electrically corrected while reflecting the gamma property of the image pickup device without an increase in noise, whereby a high-quality image accurately reproducing the actual brightness distribution in a shooting range can be obtained.

13 Claims, 6 Drawing Sheets

GAMMA PROPERTY

FIG.3

LIGHT QUANTITY DISTRIBUTION PROPERTY

LIGHT RECEIVING RATIO PROPERTY

GAMMA PROPERTY

IMAGING APPARATUS, IMAGING OPTICAL UNIT, AND IMAGING SYSTEM

BACKGROUND OF THE INVENTION

1. Field of the Invention

The present invention relates to an imaging apparatus, imaging optical unit, and imaging system such as a video camera, television camera, and digital still camera.

2. Description of the Related Art

When a subject image is picked up through an imaging optical system lens, the peripheral brightness of the picked-up image is lower than the central brightness. This phenomenon is mainly caused by the cosine biquadratic rule and vignetting.

In order to correct such a drop in peripheral light quantity, for example, as proposed in Japanese Unexamined Patent Publication No. 165023 of 1994, it is considered that a ratio of the peripheral light intensity to the central light intensity on the light receiving surface of an image pickup device is determined based on the positions of a zoom lens and a focus lens that comprise an imaging apparatus and a stop value, the reciprocal of the determined ratio is outputted as a correction coefficient, and an image signal is multiplied by the correction coefficient, whereby the light quantity distribution on the image pickup surface is electrically corrected.

However, the method for correcting a drop in peripheral light quantity proposed in the above-mentioned publication is not sufficient for the following reason.

Figure 8:
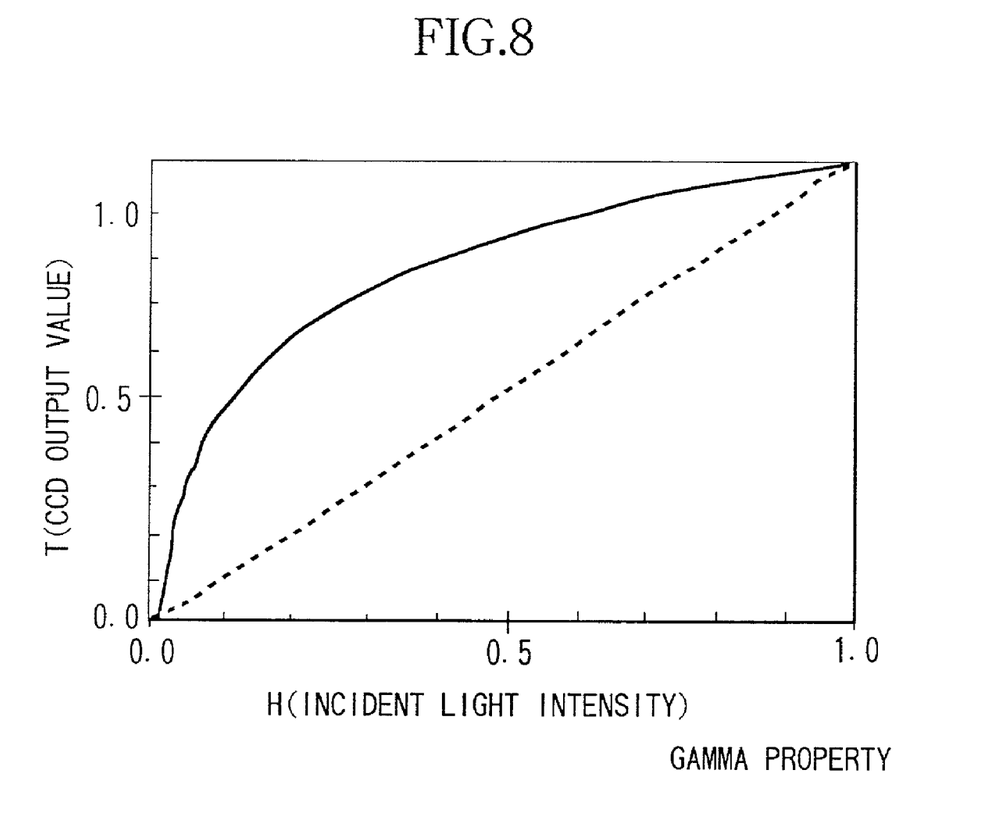
FIG. 8 is a diagram for explaining gamma correction of image signals in a conventional imaging apparatus.

That is, in the image pickup device, the output value is not always in proportion to the incident light quantity, and the output value has a peculiar gamma property as shown in FIG. 8. Therefore, even if the peripheral incident light quantity is 10% lower than the central incident light quantity, it is not proper that 10% correction of the entirety of output from the image pickup device is corrected. That is, in many cases, the actual brightness distribution in the shooting range cannot be accurately reproduced.

Another method is also considered in which gamma correction is made for outputs from the image pickup device so that the gamma property becomes a straight line, and then the light quantity correction is made. However, the desired gamma property of the imaging apparatus is not a straight line, so that in this case it is necessary to make gamma correction again, resulting in an increase in noise.

Furthermore, the image pickup device has a characteristic by which the light receiving ratio changes depending on the incidence angle of an incident light flux. That is, the device has light receiving ratio distribution in accordance with the position of the exit pupil, and this also causes the light quantity to lower at the peripheral portion at which the incident light flux greatly tilts with respect to the light receiving surface of the image pickup device. Specifically, this light receiving ratio distribution greatly influences an image pickup device provided with micro lenses at the light receiving surface.

SUMMARY OF THE INVENTION

The object of the invention is to provide an imaging apparatus, imaging optical unit, and imaging system which can electrically correct a drop in peripheral light quantity without an increase in noise while reflecting the gamma property of the image pickup device, and can obtain high-quality images accurately reproducing the actual brightness distribution in a shooting range.

In order to achieve the abovementioned object, an imaging apparatus according to the invention, which picks-up a subject image formed by a imaging optical unit, comprises:
   an image pickup device for photoelectrically converting the subject image;
   a memory for storing the gamma property data of the image pickup device and light quantity distribution data of incident light in accordance with pixel positions on the image pickup device; and
   a correcting circuit for correcting image signals outputted from the pixels of the image pickup device based on the gamma property data and light quantity distribution data stored in the memory.

Furthermore, in the abovementioned imaging apparatus according to the invention, light receiving ratio distribution data in accordance with the pixel positions on the image pickup device may be stored in the memory. In this case, the correcting circuit corrects image signals outputted from each pixel based on the gamma property data, light quantity distribution data, and light receiving ratio distribution data which are stored in the memory.

Furthermore, in the abovementioned imaging apparatus according to the invention, a detecting circuit for detecting the condition of the imaging optical unit may be provided. In this case, the correcting circuit corrects image signals based on light quantity distribution data in accordance with the condition of the imaging optical unit detected by the detecting circuit in the light quantity distribution data stored in the memory.

Furthermore, an imaging optical unit according to the invention, which can be detachably mounted to an imaging apparatus having an image pickup device for photoelectrically converting a subject image, and forms a subject image on the image pickup device, comprises:
   a memory for storing light quantity distribution data in accordance with pixel positions on the image pickup device; and
   a communications terminal for transmitting the light quantity distribution data stored in the memory to the imaging apparatus.

Furthermore, an imaging system according to the invention, which includes an imaging apparatus having an image pickup device for photoelectrically converting a subject image and an imaging optical unit which can be detachably mounted to the imaging apparatus and forms a subject image on the image pickup device, comprises:
   an optical unit side memory provided in the imaging optical unit, where the optical unit side memory stores light quantity distribution data of incident light in accordance with pixel positions on the image pickup device;
   a communications terminal for data communications between the imaging apparatus and the imaging optical unit;
   an imaging apparatus side memory provided in the imaging apparatus, where the imaging apparatus side memory stores gamma property data of the image pickup device; and
   a correcting circuit provided in the imaging apparatus, where the correcting circuit corrects image signals outputted from the pixels of the image pickup device based on the gamma property data stored in the imaging apparatus side memory and the light quantity distribution data that is received from the imaging optical unit via the communications terminal and stored in the optical unit side memory.

Furthermore, in the abovementioned imaging system according to the invention, light receiving ratio distribution data in accordance with the pixel positions on the image pickup device may also be stored in the imaging apparatus side memory. In this case, the correcting circuit corrects image signals outputted from the pixels based on the gamma property data, light quantity distribution data and light receiving ratio distribution data.

Furthermore, in the abovementioned imaging system according to the invention, a detecting circuit for detecting the condition of the imaging optical unit may be provided. In this case, the correcting circuit receives light quantity distribution data in accordance with the condition of the imaging optical unit detected by the detecting circuit in the light quantity distribution data stored in the optical unit side memory from the imaging optical unit, and corrects image signals based on this light quantity distribution data.

DETAILED DESCRIPTION OF THE PREFERRED EMBODIMENTS

Figure 1:
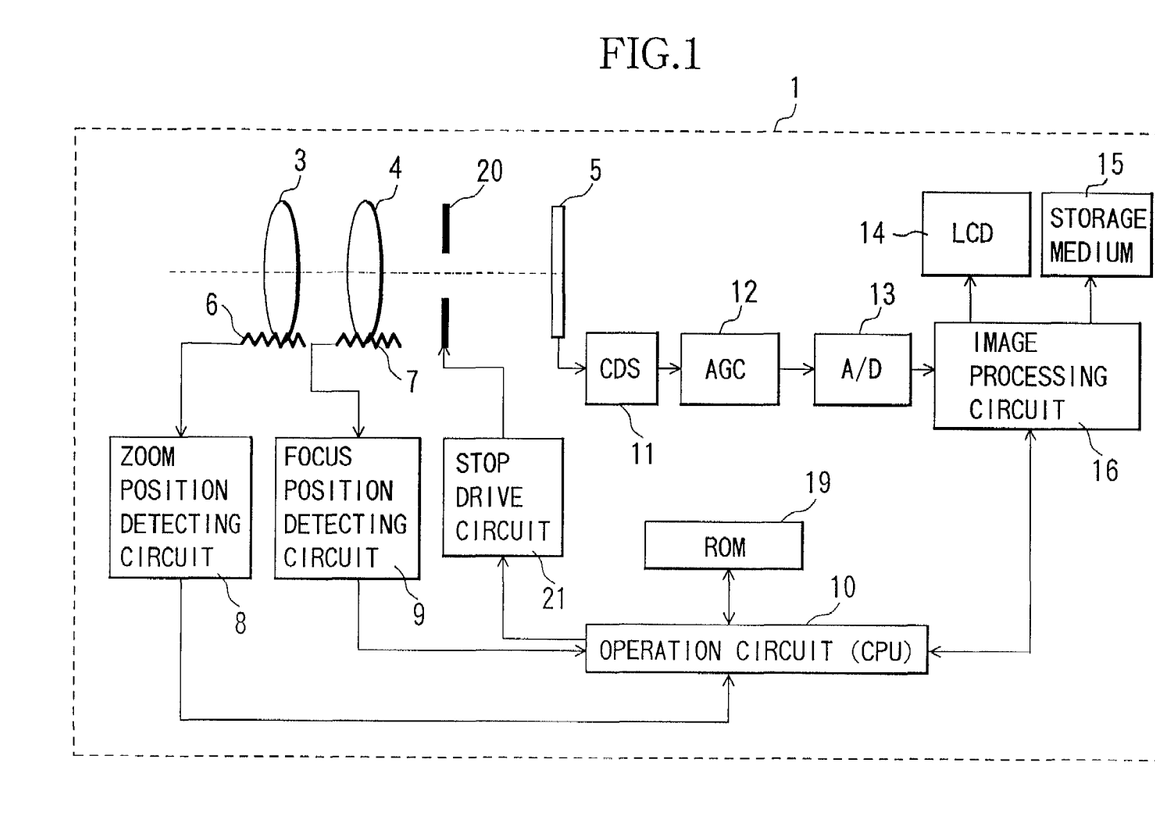
FIG. 1 is a block diagram of an imaging apparatus of an embodiment of the invention.

FIG. 1 shows the construction of imaging apparatus 1 of an embodiment of the invention. In this figure, an image of light from a subject is formed on CCD 5 which is an image pickup device through an imaging (shooting) optical unit including variator group 3, focusing group 4, and stop 20.

Pixels composing the CCD 5 output image signals in response to photoelectric conversion, and the image signals are subjected to sampling by CDS (sampling) circuit 11 and gain adjustment by AGC (auto gain control) circuit 13, and then digitalized by A/D converter 13 and transmitted to image processing circuit 16. In this image processing circuit 16, video signals and frame signals that are predetermined based on the image signals from the pixels are generated.

On the other hand, a signal from encoder 6 which outputs the signal in accordance with the position of the variator group 3 (zoom position) is inputted into zoom position detecting circuit 8, and the zoom position detecting circuit 8 transmits information indicating the zoom position to operation circuit 10 which is a CPU. Herein, the operation circuit 10 and image processing circuit 16 composes a correcting circuit.

Furthermore, a signal from encoder 7 which outputs the signal in accordance with the position of the focusing group 4 (focus position) is inputted into focus position detecting circuit 9, and the focus position detecting circuit 9 transmits information indicating the focus position to the operation circuit 10.

Furthermore, the stop 20 is controlled to be at a desired stop value by stop drive circuit 21.

Light quantity distribution data in accordance with pixel positions on the CCD 5 for each zoom position, each focus position, each stop value, and each sensitivity is stored (memorized) in memory (nonvolatile memory such as an EEPROM) 19. Ideal gamma property data of the CCD 5 is stored in advance in the memory 19.

Next, the operation executed by the operation circuit 10 is explained. First, when zoom position information and focus position information are transmitted from the zoom position detecting circuit 8 and focus position detecting circuit 9 to the operation circuit 10, and stop value setting information is inputted from the stop drive circuit 21, the operation circuit 10 reads-out light quantity distribution data and ideal gamma property data in the CCD 5 corresponding to zoom position information, focus position information, and stop value information at this time from the memory 19 and transmits this data to the image processing circuit 16.

Figure 2:
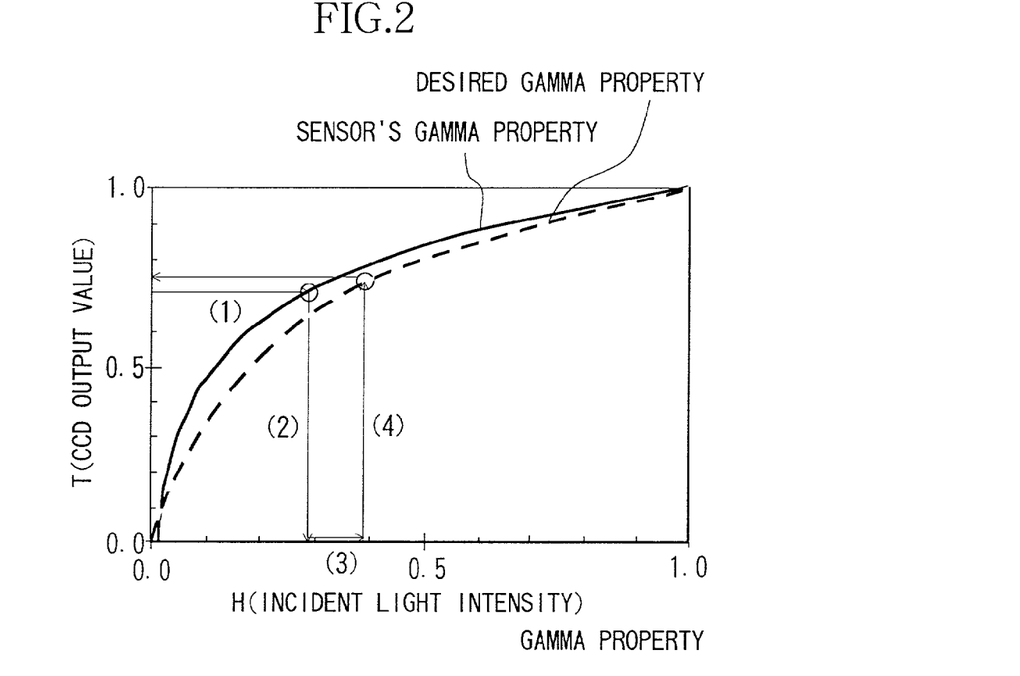
FIG. 2 is a diagram showing the gamma property of a CCD used in the imaging apparatus.

Herein, the abovementioned actual gamma property data and ideal gamma property data are explained with reference to FIG. 2. FIG. 2 shows an actual gamma property (actual gamma property data) of the CCD 5 with a solid line. In this figure, the horizontal axis shows the incident light quantity H, and the vertical axis shows the output value D from the CCD 5. As clearly understood from this figure, the actual gamma property of the CCD 5 is not a straight line, and suddenly drops in output value of the CCD 5 when the incident light quantity decreases.

Therefore, for example, when an image is displayed by using image signals obtained by this gamma property, even if the degree of drop in light quantity at the peripheral portion of the CCD 5 is small, the output values from pixels of this peripheral portion lower greatly, and the degree of darkness of the peripheral portion becomes great in comparison with the central portion. That is, an extreme difference is generated such that the peripheral portion is very dark although the central portion is very bright.

On the other hand, in FIG. 2, an ideal (desired) gamma property (ideal gamma property data) of the CCD 5 is shown by a chain line. In this ideal gamma property data, the change in output value of the CCD 5 with respect to the change in incident light quantity is gentler than that of the gamma property that is the actual gamma property data of the CCD 5 shown by the solid line, so that an extreme difference in image brightness is rarely generated between the central portion and peripheral portion even if the incident light quantity with respect to the pixels of the peripheral portion is small (that is, an image whose light quantity level is even for the entirety of the image pickup surface).

Figure 3:
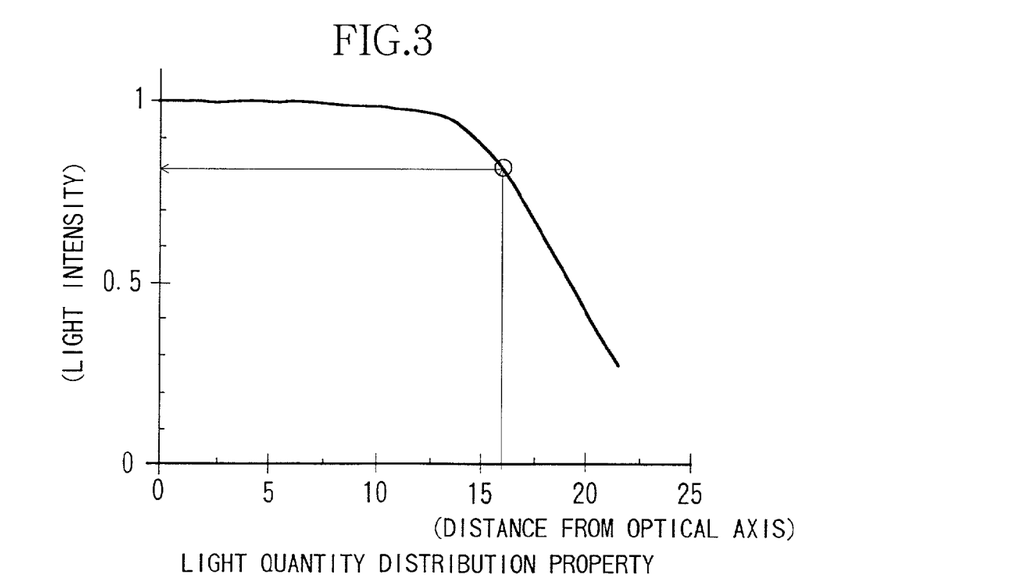
FIG. 3 is a diagram showing the light quantity distribution property on the CCD.

The abovementioned light quantity distribution data is explained with reference to FIG. 3. FIG. 3 shows the light quantity distribution property of incident light from the imaging optical system on the CCD 5. In this figure, the horizontal axis shows the distance from the optical axis, and the vertical axis shows the light quantity. As clearly understood from this figure, the closer to the peripheral portion from the optical axis, the lower the light quantity to reach the CCD 5.

Figure 4:
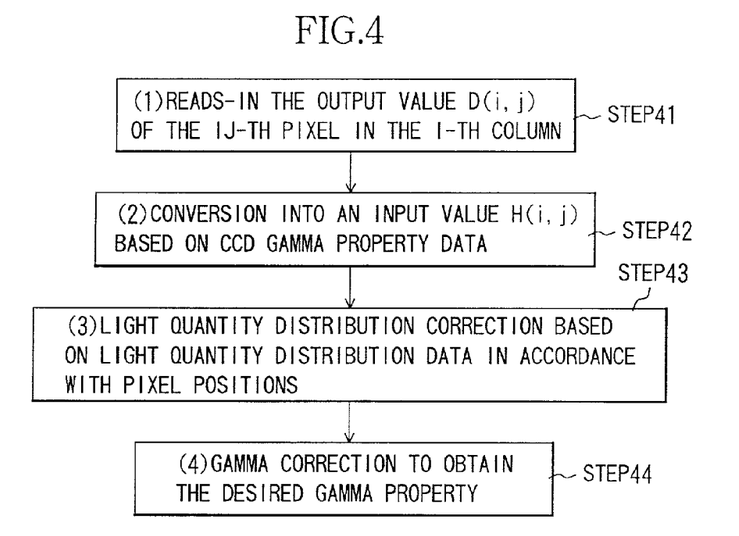
FIG. 4 is an operation flowchart of an image processing circuit of the imaging apparatus.

Hereinafter, the operation of the image processing circuit 16 is explained based on the flowchart shown in FIG. 4 while referring to FIG. 2 and FIG. 3.

As mentioned above, the operation circuit 10 reads-out light quantity distribution data, corresponding to current zoom position information, focus position information, and stop value information, and ideal gamma property data of the CCD 5, and transmits these data to the image processing circuit 16. Then, as shown by (1) in FIG. 2, in response to the output from the CCD 5, (1) the image processing circuit 16 reads-in the output value D (i,j) of the ij-th pixel in the i-th column first (step 41).

Next, as shown by (2) in FIG. 2, (2) the image processing circuit 16 converts the output value D (i,j) into an incident light quantity H (i,j) based on the gamma property data of the CCD 5 (step 42). Then, as shown by (3) in FIG. 2, (3) the image processing circuit 16 corrects the light quantity distribution of the incident light quantity H by using light quantity distribution data in accordance with the pixel position (step 43).

Concretely, as shown in FIG. 3, when the incident light quantity at the position of the ij-th pixel in the i-th column on the CCD 5 is smaller than the incident light quantity of the optical axis center (at a distance of zero), in accordance with the ratio, the incident light quantity H (i,j) is corrected so as to increase and become equal to the incident light quantity of the optical axis center.

Next, as shown by (4) in FIG. 2, (4) the image processing circuit 16 operates and generates an image signal (corrected image signal) in response to the corrected incident light quantity H (i,j) (gamma correction is carried out) by using ideal gamma property data readout from the memory 19 so that the desired gamma property of the CCD 5 shown by the chain line in FIG. 2 is obtained (step 44). The abovementioned light quantity correction and gamma property correction may be applied for all pixels, or applied for pixels at the periphery of the image pickup surface. In addition, the same light quantity correction and same gamma property correction may be applied for pixels at an equal distance from the center of the image pickup surface.

Corrected image signals thus generated for each pixel are recorded in a storage medium 15 such as a memory as an image recording part, or outputted to LCD 14 that is an image display device and displayed.

Thus, according to the present embodiment, since image signals outputted from each pixel of the CCD 5 are corrected based on the ideal gamma property data of the CCD 5 and the light quantity distribution data of the incident light in accordance with the pixel positions on the CCD 5, the gamma property of the CCD 5 can be reflected, and a drop in peripheral light quantity can be electrically corrected without an increase in noise, whereby a high-quality image accurately reproducing the actual brightness distribution in a shooting range can be obtained. That is, when the brightness in a shooting range is almost even, an image whose light quantity level is entirely even can be obtained. In addition, when the peripheral portion is slightly darker than the central portion in a shooting range, an image can be obtained that has brightness distribution which is almost similar to that of the actual shooting range so that the peripheral portion is not excessively dark.

Figure 6:
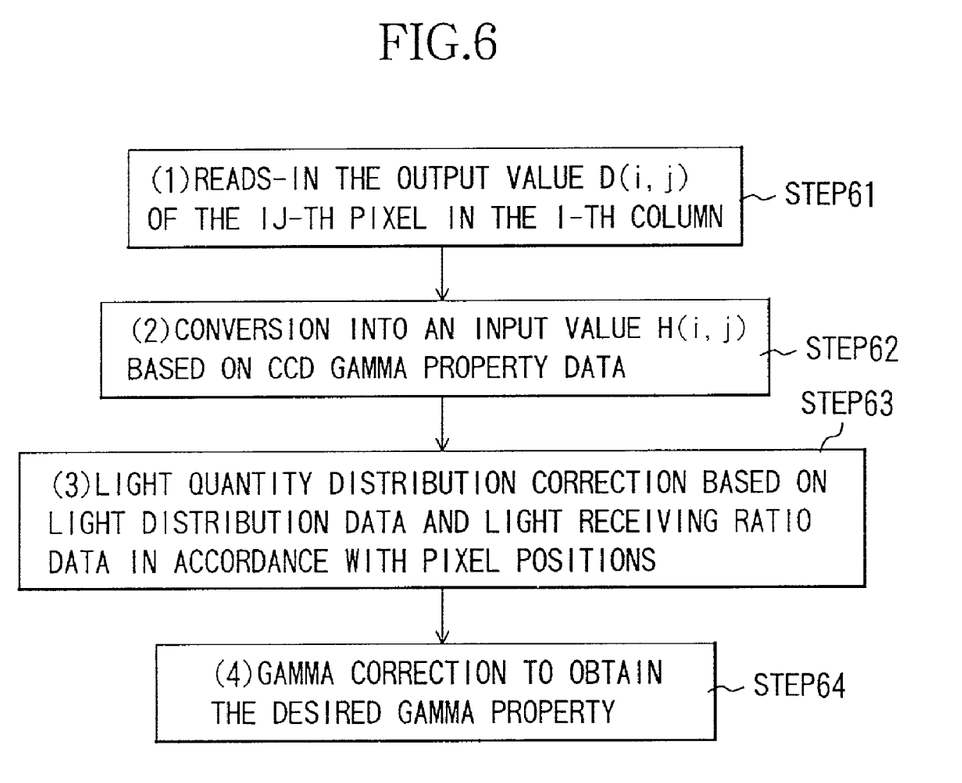
FIG. 6 is an operation flowchart of the image processing circuit in the imaging apparatus of the embodiment shown in FIG. 5.

FIG. 6 shows a flowchart of processing to be executed by the image processing circuit of the imaging apparatus according to another embodiment of the invention. The construction of the imaging apparatus is basically the same as in the abovementioned embodiment, so that the same symbols as in the abovementioned embodiment are attached to the common components in explanation of the present embodiment.

In the present embodiment, light quantity distribution data of incident light in accordance with the pixel positions on the CCD 5 in response to each zoom position, each focus position, each stop value, and each sensitivity and light receiving ratio distribution data in accordance with the pixel positions on the CCD 5 are stored in advance in the memory 19. The ideal gamma property data of the CCD 5 is also stored in the memory 19.

Figure 5:
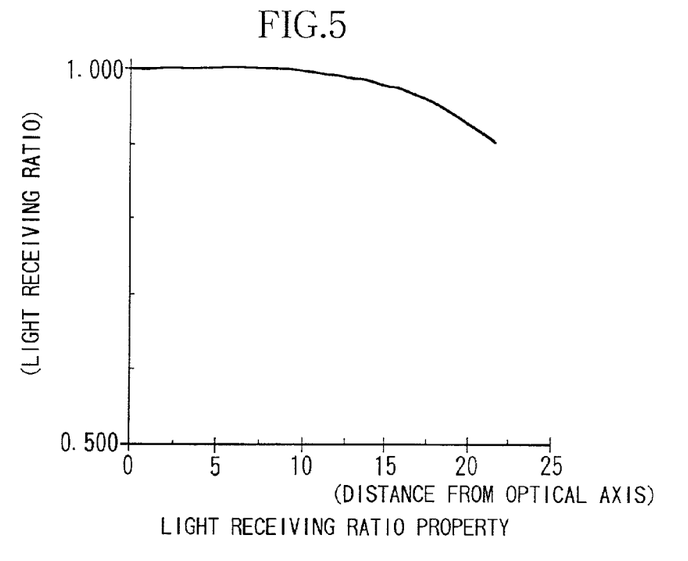
FIG. 5 is a graph showing the light receiving ratio distribution property of a CCD used in an image processing circuit of an imaging apparatus of another embodiment of the invention.

Herein, FIG. 5 shows the light receiving ratio distribution property on the CCD 5. In this figure, the horizontal axis shows the distance from the optical axis, and the vertical axis shows the light receiving ratio. As clearly understood from this figure, the closer to the peripheral portion from the optical axis, the greater the tilt of the light flux to reach the CCD 5 with respect to the light receiving surface of the CCD 5. Therefore, the light receiving ratio of the CCD 5 lowers.

Hereinafter, the operation of the image processing circuit 16 is explained with reference to the flowchart of FIG. 6, and FIG. 2, FIG. 3, and FIG. 5. As in the abovementioned embodiment, the operation circuit 10 reads-out light quantity distribution data, light receiving ratio distribution data, and ideal gamma property data corresponding to current zoom position information, focus position information, and stop value information from the memory 19, and transmits these data to the image processing circuit 16. Then, as shown by (1) of FIG. 2, (1) at first, the image processing circuit 16 reads-in the output value D (i,j) from the ij-th pixel in the i-th column based on the output value from CCD 5 (step 61).

Next, as shown by (2) in FIG. 2, (2) the image processing circuit 16 converts the output value D (i,j) into an incident light quantity H (i,j) based on the actual gamma property data of the CCD 5. Then, as shown by (3) in FIG. 2, (3) the image processing circuit 16 corrects the light quantity distribution and light receiving ratio distribution of the incident light quantity H by using the light quantity distribution data and light receiving ratio distribution data in accordance with the pixel position (step 63).

Concretely, when the incident light quantity or light receiving ratio at a position of the ij-th pixel in the i-th column on the CCD 5 is smaller than the incident light quantity or light receiving ratio at the optical axis center (at a zero distance) (in the case of a pixel being apart from the optical axis center in FIG. 3 and FIG. 5), in accordance with the difference, the incident light quantity H (i,j) is corrected and increased.

Next, as shown by (4) in FIG. 2, (4) the image processing circuit 16 operates and generates an image signal (corrected image signal) in accordance with the corrected incident light quantity H (i,j) (gamma correction is carried out) by using the ideal gamma property data readout from the memory 19 so that the desired gamma property of the CCD 5 that is shown by the chain line in FIG. 2 and explained in the abovementioned embodiment can be obtained (step 64) The abovementioned light quantity correction and gamma property correction may be applied for all pixels, or pixels at the periphery of the image pickup surface. In addition, the same light quantity correction and same gamma property correction may be applied for pixels at an equal distance from the center of the image pickup surface.

Corrected image signals thus generated for each pixel are recorded in the storage medium 15 such as a memory of an image recording part or outputted to the LCD 14 that is an image display device and displayed.

Thus, according to the present embodiment, since image signals outputted from each pixel of the CCD 5 are corrected based on the ideal gamma property data of the CCD 5, light quantity distribution data of incident light in accordance with pixel positions on the CCD 5, and light receiving ratio distribution data in accordance with the pixel positions, the gamma property of the CCD 5 can be reflected, and a drop in peripheral light quantity can be electrically corrected without an increase in noise, whereby a high-quality image accurately reproducing the actual brightness distribution in a shooting range can be obtained.

In each embodiment mentioned above, the case where image signals from each pixel are corrected based on light quantity distribution data and light receiving ratio distribution data in accordance with all pixel positions of the CCD 5 is explained. However, in order to reduce the load of the image processing circuit 16 and reduce data to be stored in the memory 19, correction may be made based on each piece of light quantity distribution data and light receiving ratio distribution data that are massed for each pixel group (for example, for each pixel group consisting of pixels at an equal distance from the center of the image pickup surface).

Figure 7:
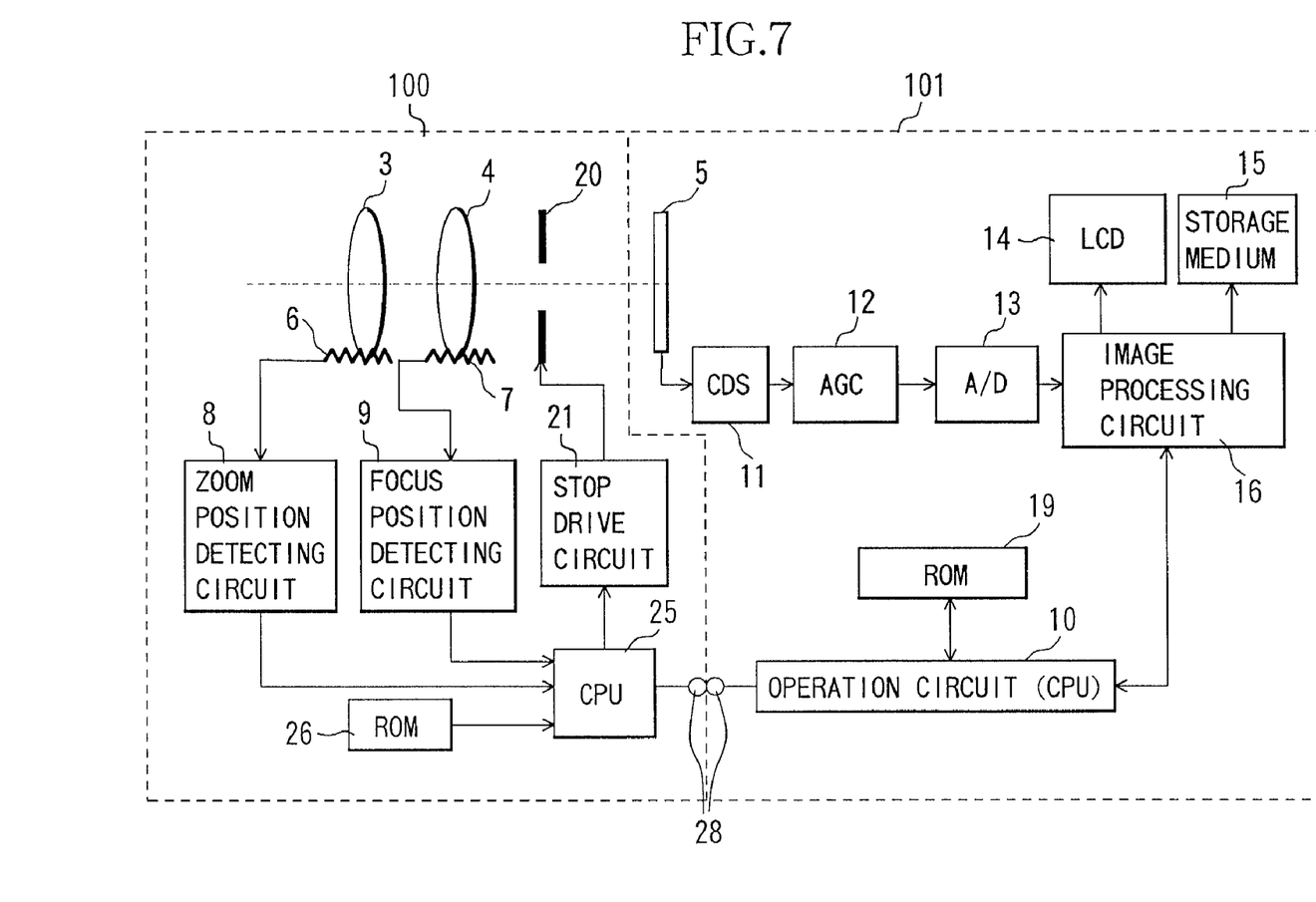
FIG. 7 is a block diagram of an imaging system to which the invention has been applied.

Furthermore, in each embodiment mentioned above, the imaging apparatus with an imaging optical unit integrally provided is explained, however, the invention can also be applied to an imaging system constructed so that imaging optical unit 100 shown in FIG. 7 can be detachably (replaceably) mounted to imaging apparatus 101. Furthermore, the imaging apparatus 101 is provided with CCD 5, storage medium 15 as an image recording part for recording image signals, and LCD 14 as an image display device.

In this case, a memory (ROM) 19 for storing light quantity distribution data is provided at the imaging optical unit 100. When the imaging optical unit 100 is mounted to the imaging apparatus 101, light quantity distribution data stored in the memory 26 is transmitted from the CPU 25 at the imaging optical unit 100 side to the CPU (operation circuit) 10 at the imaging apparatus 101 side via mounting contact 28. In the image processing circuit 16 of the imaging apparatus 101, gamma properties of image signals from each pixel of the CCD 5 are corrected based on the light quantity distribution data received from the imaging optical unit 100 and the ideal gamma property data (and light receiving ratio distribution data) that is stored in the memory (ROM) 19 provided at the imaging apparatus 101 side.

Furthermore, the imaging apparatus 1 or 101 according to each embodiment mentioned above may be arranged so that the storage medium 15 storing image signals is removed from the imaging apparatus 1 or 101, set in an image display apparatus which is separated from this imaging apparatus, and caused to reproduce and display images. Thereby, an image display system which can display high-quality picked-up images can be realized.

As described above, according to each embodiment mentioned above, image signals outputted from each pixel are corrected based on the ideal gamma property data of the image pickup device and light quantity distribution data of incident light in accordance with pixel positions on the image pickup device, or image signals outputted from each pixel are corrected based on the gamma property data of the image pickup device, light quantity distribution data of incident light in accordance with the pixel positions on the image pickup device, and light receiving ratio distribution data in accordance with the pixel positions. Thereby, while reflecting the ideal gamma property of the image pickup device, a drop in peripheral light quantity can be electrically corrected without an increase in noise, whereby a high-quality image accurately reproducing the actual brightness distribution in a shooting range can be obtained.

Furthermore, if the light quantity distribution data to be used for correction of image signals is changed depending on the condition of the imaging optical unit, optimum electrical light quantity correction can always be made regardless of the condition of the imaging optical unit.

What is claimed is:

1. An imaging apparatus for picking-up a subject image formed by a imaging optical unit, comprising:
    an image pickup device for photoelectrically converting the subject image;
    a memory for storing gamma property data of said image pickup device and light quantity distribution data of incident light in accordance with pixel positions on the image pickup device; and
    a correcting circuit for correcting image signals outputted from each pixel of the image pickup device based on the gamma property data and light quantity distribution data that are stored in said memory,
    wherein the memory also stores light receiving ratio distribution data in accordance with pixel positions on the image pickup device, and
    the correcting circuit corrects the image signals outputted from each pixel based on the gamma property data, light quantity distribution data, and light receiving ratio distribution data that are in the memory, and
    wherein the correcting circuit determines incident light quantity for each pixel based on the image signals outputted from each pixel and gamma property data stored in the memory, corrects the determined incident light quantity based on the light quantity distribution data and light receiving ratio distribution data, and generates corrected image signals in accordance with the corrected incident light quantity.

2. An imaging apparatus according to claim 1, wherein the correcting circuit determines incident light quantity for each pixel based on the image signals outputted from each pixel and the gamma property data stored in the memory, corrects the incident light quantity based on the light quantity distribution data stored in the memory, and generates corrected image signals in accordance with the corrected incident light quantity.

3. An imaging apparatus according to claim 1, further comprising:
    a detecting circuit for detecting the condition of the shooting optical unit, wherein the correcting circuit corrects image signals based on light quantity distribution data in accordance with the condition of the imaging optical unit detected by said detecting circuit in the light quantity distribution data stored in the memory.

4. An imaging apparatus according to claim 3 wherein the condition of the imaging optical unit to be detected by the detecting circuit includes at least one of the zooming condition, focusing condition, and stop condition.

5. An imaging apparatus according to claim 1, further comprising:
    an image recording circuit for recording the image signals corrected by the correcting circuit.

6. An imaging apparatus according to claim 1, further comprising:
    an image display device for displaying images obtained by the image signals corrected by the correcting circuit.

7. An imaging system provided with an imaging apparatus having an image pickup device for photoelectrically converting a subject image and an imaging optical unit that can be detachably mounted to the imaging apparatus and forms a subject image on the image pickup device, comprising:
    an optical unit side memory provided in the imaging optical unit, where the optical unit side memory stores light quantity distribution data of incident light in accordance with pixel positions on the image pickup device;

a communications terminal for data communications between the imaging apparatus and the imaging optical unit;

an imaging apparatus side memory provided in the imaging apparatus, where the imaging apparatus side memory stores gamma property data of the image pickup device; and a correcting circuit provided in the imaging apparatus, where the correcting circuit corrects image signals outputted from each pixel of the image pickup device based on the gamma property data stored in the imaging apparatus side memory and the light iuantity distribution data that is stored in the optical unit side memory and received from the imaging optical unit via the communications terminal, wherein the correcting circuit determines incident light quantity for each pixel based on the image signals outputted from each pixel and gamma property data stored in the imaging apparatus side memory, corrects the determined incident light quantity based on the light quantity distribution data stored in the optical unit side memory, and generates corrected image signals in accordance with the corrected incident light quantity.

8. An imaging system according to claim 7, wherein the imaging apparatus side memory also stores light receiving ratio distribution data in accordance with pixel positions on the image pickup device, and the correcting circuit corrects the image signals outputted from each pixel based on the gamma property data, light quantity distribution data, and light receiving ratio distribution data.

9. An imaging system according to claim 7, wherein the imaging optical unit further has a detecting circuit for detecting the condition of the imaging optical unit, wherein the correcting circuit receives light quantity distribution data in accordance with the condition of the imaging optical unit detected by the detecting circuit in the light quantity distribution data stored in the optical unit side memory from the imaging optical unit via the communications terminal, and corrects the image signals based on the received light quantity distribution data.

10. An imaging system according to claim 9, wherein the condition of the imaging optical unit to be detected by the detecting circuit includes at least one of the zooming condition, focusing condition, and stop condition.

11. An imaging system according to claim 7, wherein the imaging apparatus has an image recording part for recording the image signals corrected by the correcting circuit.

12. An imaging system according to claim 7, wherein the imaging apparatus has an imaging display device for displaying images obtained by the image signals corrected by the correcting circuit.

13. An imaging system provided with an imaging apparatus having an image pickup device for photoelectrically converting a subject image and an imaging optical unit that can be detachably mounted to the imaging apparatus and forms a subject image on the image pickup device. comprising:

an optical unit side memory provided in the imaging optical unit, where the optical unit side memory stores light ciuantity distribution data of incident light in accordance with pixel positions on the image pickup device;

a communications terminal for data communications between the imaging apparatus and the imaging optical unit;

an imaging apparatus side memory provided in the imaging apparatus, where the imaging apparatus side memory stores gamma property data of the image pickup device; and a correcting circuit provided in the imaging apparatus, where the correcting circuit corrects image signals outputted from each pixel of the image pickup device based on the gamma property data stored in the imaging apparatus side memory and the light quantity distribution data that is stored in the optical unit side memory and received from the imaging optical unit via the communications terminal, wherein the imaging apparatus side memory also stores light receiving ratio distribution data in accordance with pixel positions on the image pickup device, and the correcting circuit corrects the image signals outputted from each pixel based on the gamma property data, light quantity distribution data, and light receiving ratio distribution data, and wherein the correcting circuit determines incident light quantity for each pixel based on the image signals outputted from each pixel and gamma property data, corrects the determined incident light quantity based on the light quantity distribution data and light receiving ratio distribution data, and generates corrected image signals in accordance with the corrected incident light quantity.

* * * * *